(12) United States Patent
Dunnigan et al.

(10) Patent No.: US 10,830,077 B2
(45) Date of Patent: Nov. 10, 2020

(54) SEALING CONFIGURATION TO REDUCE AIR LEAKAGE

(71) Applicant: UNITED TECHNOLOGIES CORPORATION, Farmington, CT (US)

(72) Inventors: Rebecca R. Dunnigan, Sturbridge, MA (US); Billie W. Bunting, Colchester, CT (US); Ted Guevel, West Hartford, CT (US); Randall Lee Greenberg, Oxford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 140 days.

(21) Appl. No.: 16/037,379

(22) Filed: Jul. 17, 2018

(65) Prior Publication Data
US 2020/0025004 A1    Jan. 23, 2020

(51) Int. Cl.
*F01D 11/00* (2006.01)
*F01D 9/06* (2006.01)

(52) U.S. Cl.
CPC .............. *F01D 11/003* (2013.01); *F01D 9/06* (2013.01); *F01D 9/065* (2013.01); *F01D 11/005* (2013.01); *F05D 2220/32* (2013.01); *F05D 2240/14* (2013.01); *F05D 2240/55* (2013.01); *F05D 2300/173* (2013.01); *F05D 2300/174* (2013.01)

(58) Field of Classification Search
None
See application file for complete search history.

(56) References Cited

U.S. PATENT DOCUMENTS

| 3,596,934 A | 8/1971 | De Cenzo |
| 4,331,338 A * | 5/1982 | Caldwell ................ F16J 15/021 277/606 |
| 4,850,794 A | 7/1989 | Reynolds, Jr. |
| 5,480,193 A | 1/1996 | Echols |
| 5,653,478 A | 8/1997 | McGurk et al. |
| 6,439,616 B1 | 8/2002 | Arafillis et al. |

(Continued)

FOREIGN PATENT DOCUMENTS

| EP | 3026222 | 6/2016 |
| EP | 3095964 | 11/2016 |

(Continued)

OTHER PUBLICATIONS

European Patent Office, European Search Report dated Nov. 13, 2019 in Application No. 19186855.3.

*Primary Examiner* — Igor Kershteyn
*Assistant Examiner* — Juan G Flores
(74) *Attorney, Agent, or Firm* — Snell & Wilmer L.L.P.

(57) ABSTRACT

A seal assembly for a fluid transfer tube in a gas turbine engine is disclosed. In various embodiments, the seal assembly includes a base member having a first side configured to mate with a casing and a second side opposite the first side, an annular ring configured to mate with the second side of the base member and to surround a portion of the fluid transfer tube, a first O-ring disposed between the annular ring and the fluid transfer tube, a second O-ring disposed between the base member and the annular ring, and an attachment ring configured to secure the annular ring and the base member to the casing.

17 Claims, 4 Drawing Sheets

(56) References Cited

U.S. PATENT DOCUMENTS

| | | | |
|---|---|---|---|
| 7,566,221 B2 | 7/2009 | Garcia et al. | |
| 8,490,409 B2 | 7/2013 | Pucovsky et al. | |
| 8,844,976 B2 | 9/2014 | Laubie | |
| 9,068,673 B2 * | 6/2015 | Mukai | F16L 5/14 |
| 9,109,510 B2 * | 8/2015 | Hashimoto | F02C 7/28 |
| 9,506,403 B2 | 11/2016 | Clarke | |
| 9,599,261 B2 | 3/2017 | Schimanski et al. | |
| 9,644,697 B2 | 5/2017 | Mitsch | |
| 9,897,236 B2 | 2/2018 | Li et al. | |
| 10,196,935 B2 * | 2/2019 | Deane | F01D 9/065 |
| 2003/0110778 A1 | 6/2003 | Karafillis et al. | |
| 2005/0199445 A1 | 9/2005 | Zalewski | |
| 2008/0012337 A1 | 1/2008 | De Bosscher | |
| 2013/0224011 A1 | 8/2013 | Hashimoto | |
| 2015/0219015 A1 | 8/2015 | Szymanski | |
| 2016/0177764 A1 | 6/2016 | Lemoine | |
| 2017/0204789 A1 | 7/2017 | Gallet | |

FOREIGN PATENT DOCUMENTS

| | | |
|---|---|---|
| JP | 61253319 | 11/1986 |
| JP | H07214279 | 8/1995 |

\* cited by examiner

SEALING CONFIGURATION TO REDUCE AIR LEAKAGE

FIELD

The present disclosure relates generally to gas turbine engines and, more particularly, to bleed air systems used within gas turbine engines and the fluid transfer tubing used therein.

BACKGROUND

Gas turbine engines, such as those used to provide thrust to an aircraft, are internal combustion engines that use air as the working fluid. In general, the gas turbine engines include a fan section and a core engine located downstream of the fan section. Air from the fan section generally passes through a bypass duct for generating thrust or through the core engine for generating power used to drive the fan. The core engine generally includes a compressor section, one or more combustors, and a turbine section. During operation, air is drawn into the fan section and accelerated by rotating fan blades. A fraction of the indrawn air is routed through the core engine, where it is compressed and pressurized by rotating blades of the compressor section before entering the combustor section. In the combustor section, the air is combusted with fuel to generate hot combustion gases. The hot combustion gases expand through and drive the turbine section, which extracts energy from the gases to power the compressor and fan sections. The hot gases are then expelled through an exhaust nozzle.

SUMMARY

A seal assembly for a fluid transfer tube in a gas turbine engine is disclosed. In various embodiments, the seal assembly includes a base member having a first side configured to mate with a casing and a second side opposite the first side, an annular ring configured to mate with the second side of the base member and to surround a portion of the fluid transfer tube, a first O-ring disposed between the annular ring and the fluid transfer tube, a second O-ring disposed between the base member and the annular ring, and an attachment ring configured to secure the annular ring and the base member to the casing.

In various embodiments, the base member is constructed of a metallic material. In various embodiments, the attachment ring is constructed of a metallic material. In various embodiments, the annular ring is constructed of one of an aluminum alloy and a titanium alloy. In various embodiments, the annular ring comprises a first split ring and a second split ring. In various embodiments, the annular ring is configured to secure the portion of the fluid transfer tube at an angle with respect to a normal vector extending from the casing.

In various embodiments, both the base member and the attachment ring include a plurality of holes extending therethrough and configured for attaching the base member and the attachment ring to the casing via a plurality of bolts. In various embodiments, a wear sleeve configured to surround the portion of the fluid transfer tube. In various embodiments, the wear sleeve is configured to surround a thermal insulation sleeve disposed between the portion of the fluid transfer tube and the wear sleeve.

A transfer tube assembly for a gas turbine engine is disclosed. In various embodiments, the transfer tube assembly includes a fluid transfer tube configured to extend through a casing, a base member having a first side configured to mate with a casing and a second side opposite the first side, an annular ring configured to mate with the second side of the base member and to surround a portion of the fluid transfer tube, a first O-ring disposed between the annular ring and the fluid transfer tube, a second O-ring disposed between the base member and the annular ring, and an attachment ring configured to secure the annular ring and the base member to the casing.

In various embodiments, a thermal insulation sleeve is positioned between the fluid transfer tube and the annular ring. In various embodiments, a wear sleeve is positioned between the thermal insulation sleeve and the annular ring. In various embodiments, the annular ring comprises a first split ring and a second split ring. In various embodiments, the annular ring is configured to secure the portion of the fluid transfer tube at an angle with respect to a normal vector extending from the casing.

A bleed air assembly for a gas turbine engine is disclosed. In various embodiments, the bleed assembly includes a fluid transfer tube configured to provide compressed air from a compressor to a component external to the compressor, the fluid transfer tube having a tube portion configured to extend through a casing, a base member having a first side configured to mate with a casing and a second side opposite the first side, an annular ring configured to mate with the second side of the base member and to surround an exterior surface of the fluid transfer tube, a first O-ring disposed between the annular ring and the fluid transfer tube, a second O-ring disposed between the base member and the annular ring, and an attachment ring configured to secure the annular ring and the base member to the casing.

In various embodiments, the first O-ring and the second O-ring are configured to enable movement of the tube portion with respect to the casing. In various embodiments, a thermal insulation sleeve is positioned between the tube portion and the annular ring. In various embodiments, a wear sleeve is positioned between the tube portion and the annular ring. In various embodiments, the annular ring comprises a first split ring and a second split ring. In various embodiments, the annular ring is configured to secure the portion of the fluid transfer tube at an angle with respect to a normal vector extending from the casing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
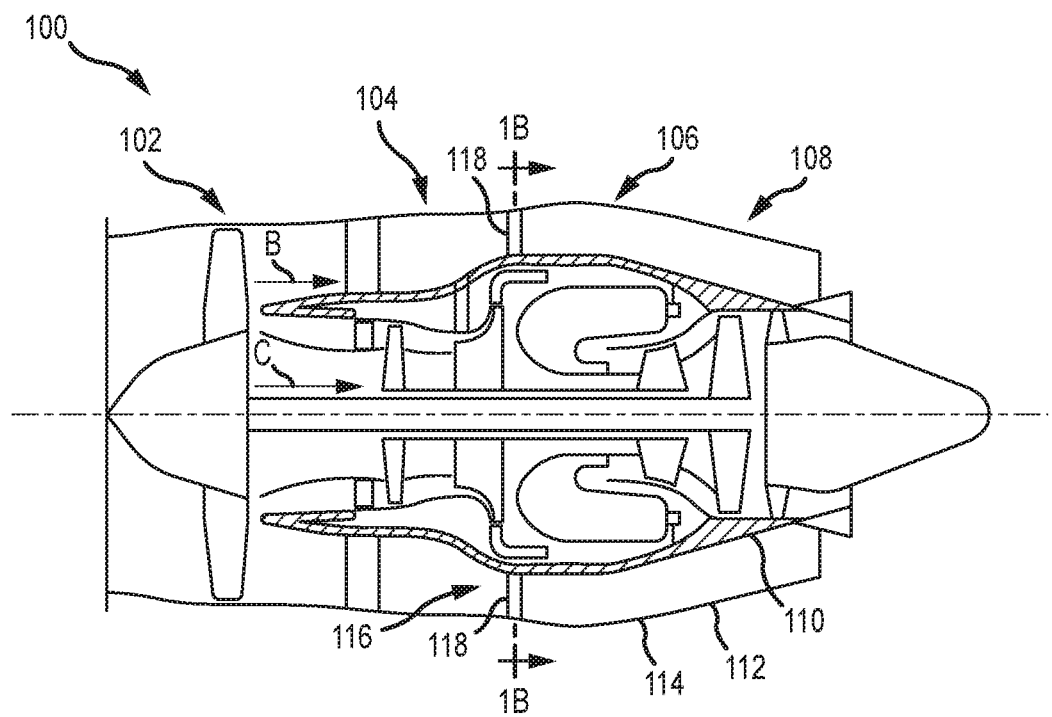
FIGS. 1A and 1B are schematic side and axial cross-sectional views, respectively, of a gas turbine engine, in accordance with various embodiments.
Figure 1B:
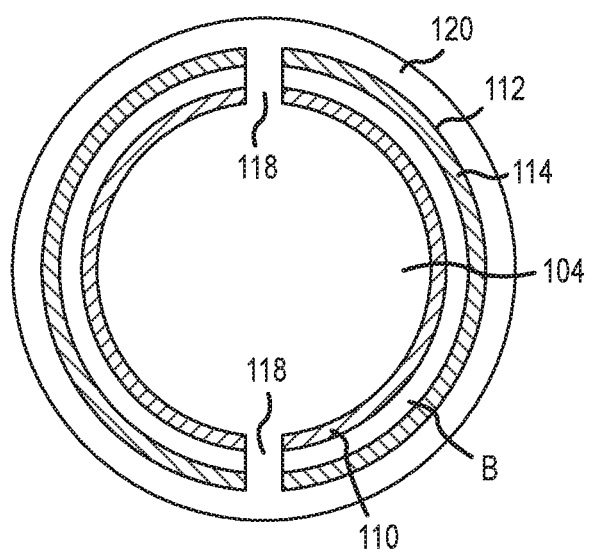

Referring now to the drawings, FIGS. 1A and 1B schematically illustrate a gas turbine engine 100, in accordance with various embodiments. The gas turbine engine 100 is disclosed herein as a two-spool turbofan that generally incorporates a fan section 102, a compressor section 104, a combustor section 106 and a turbine section 108. Alternative engines might include an augmenter section (not shown) among other systems or features. The fan section 102 drives air along a bypass duct or flow path B in a bypass duct defined between a core engine outer casing 110 and an outer bypass duct casing 112, which may also be referred to as an inner nacelle casing 114. The compressor section 104 drives air along a primary or core flow path C for compression and communication into the combustor section 106 and then expansion through the turbine section 108. Although depicted as a two-spool turbofan gas turbine engine in the disclosed non-limiting embodiment, it will be understood that the concepts described herein are not limited to use with two-spool turbofans as the teachings may be applied to other types of turbine engines, including single-spool and three-spool architectures.

Referring still to FIGS. 1A and 1B, the gas turbine engine 100 also includes a bleed air system 116, used to bleed air from points within the compressor section 104 to other components within the gas turbine engine 100. In various embodiments, the bleed air system 116 includes one or more transfer tube assemblies 118. In general, transfer tube assemblies, such as the one or more transfer tube assemblies 118 just referred, are used to transport bleed air or other fluids, such as fuel or hydraulic fluid, from one component of the gas turbine engine 100 to another. In various embodiments, the one or more transfer tube assemblies 118 may be used in conjunction with the bleed air system 116 to transport bleed air from points within the compressor section 104 to points within a nacelle 120, passing first through the core engine outer casing 110, through the bypass duct or flow path B, and then through the outer bypass duct casing 112 or inner nacelle casing 114 for further transport to points within the nacelle 120 of the gas turbine engine 100. While transport of bleed air from the compressor section 104 to the nacelle 120 is described above and herein, the disclosure contemplates transport of other fluids, such as fuels and lubricants and not simply air, from various points within the gas turbine engine 100 to other points within the engine.

Figure 2A:
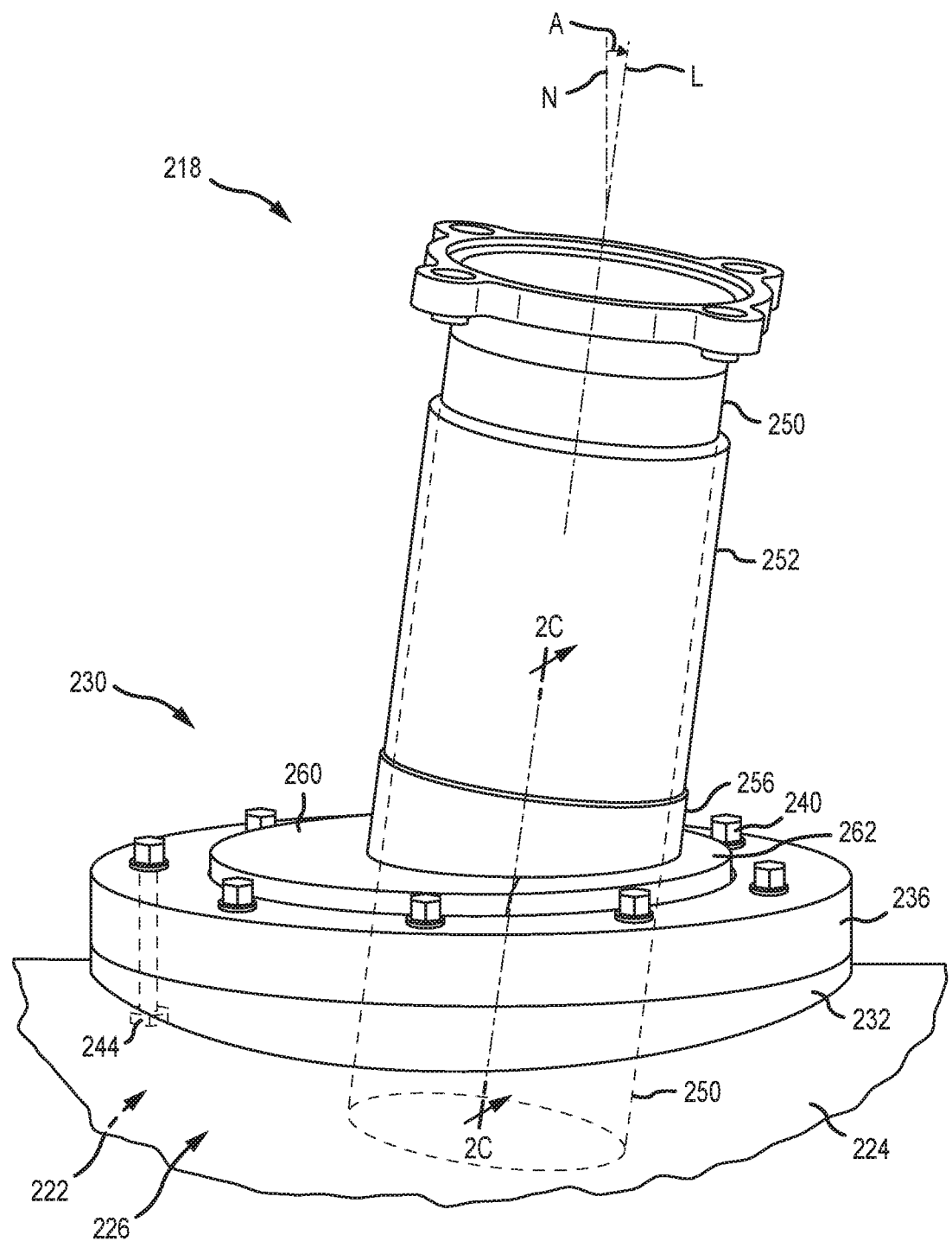
FIGS. 2A, 2B and 2C are schematic assembled, exploded and cross sectional views, respectively, of a transfer tube assembly having a sealing assembly, in accordance with various embodiments.
Figure 2B:
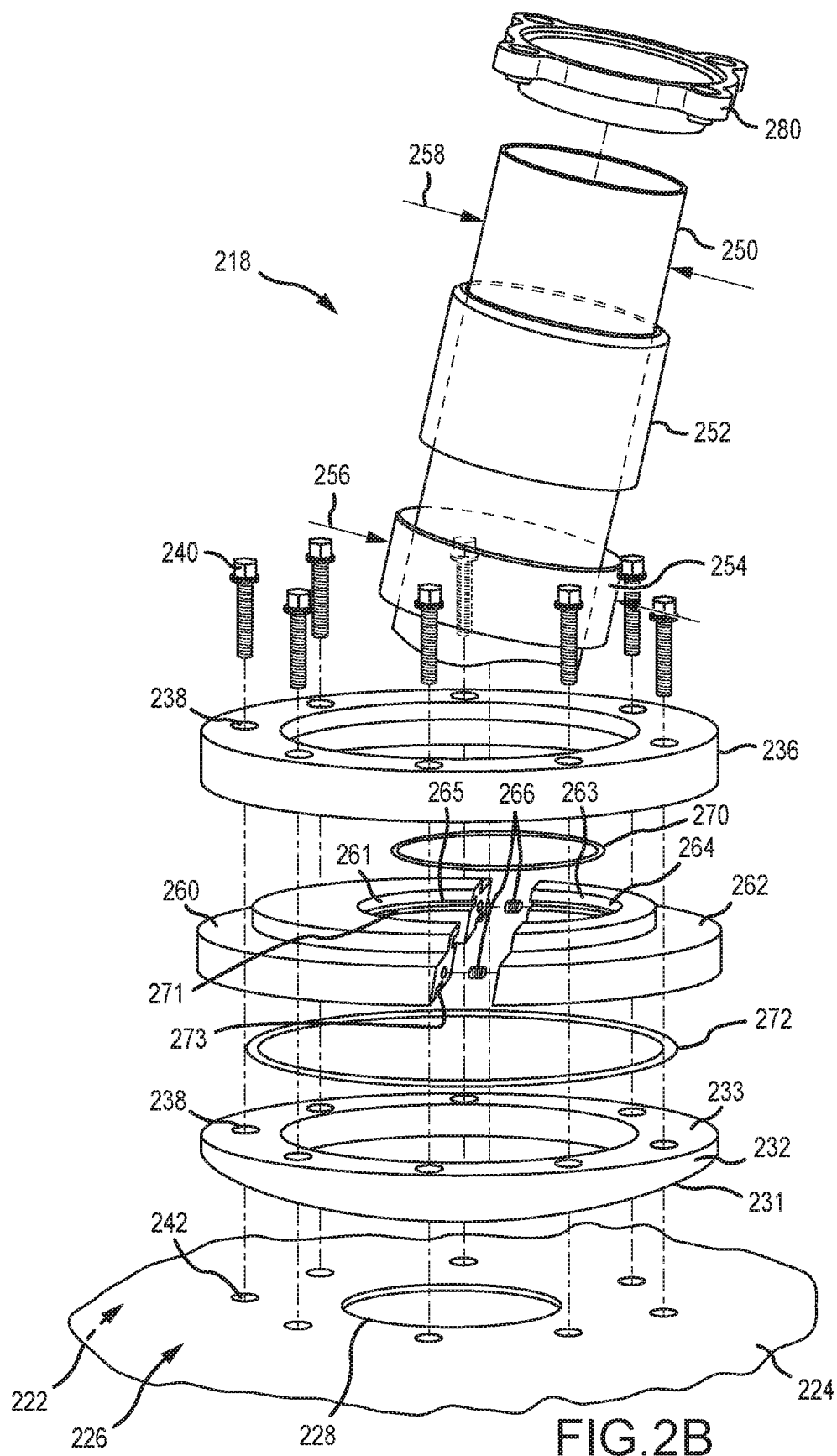

Referring now to FIGS. 2A and 2B, a transfer tube assembly 218, such as, for example, one of the one or more transfer tube assemblies 118 described above with reference to FIGS. 1A and 1B, is illustrated in assembled and exploded form. In various embodiments, the transfer tube assembly 218 includes a sealing assembly 230 configured to reduce or minimize leakage of fluid being transported from an inner side 222 of a casing 224 to an outer side 226 of the casing 224. In various embodiments, the transfer tube assembly 218 further includes a fluid transfer tube 250 that typically extends from the inner side 222 of the casing 224 to the outer side 226 of the casing 224 via an aperture 228 that extends through the casing 224. In various embodiments, the fluid transfer tube 250 may float within the sealing assembly 230 or be fixed to structure or componentry existing within a chamber or cavity defined by the inner side 222 of the casing 224.

In various embodiments, the sealing assembly 230 comprises a base member 232 having a substantially annular geometry, a first side 231 configured to match the shape of the surface of the outer side 226 of the casing 224 and a second side 233 that is substantially flat. In various embodiments, the base member 232 is constructed from a metallic material, such as, for example, an aluminum alloy or a titanium alloy. An attachment ring 236 is sized to substantially mirror the annular geometry of the base member 232 and to secure the base member 232 to the outer surface 226 of the casing 224. In various embodiments, both the base member 232 and the attachment ring 236 include a plurality of holes 238, each of which is configured to receive one of a plurality of bolts 240. Each of the plurality of bolts 240 is received by a corresponding one of a plurality of threaded apertures 242 that are positioned through the casing 224 or that comprise captured nuts 244 positioned on the inner side 222 of the casing 224.

Still referring to FIGS. 2A and 2B, the sealing assembly 230 is configured to engage a wear sleeve 254 that surrounds a thermal insulation sleeve 252. In various embodiments, the thermal insulation sleeve 252 is sized to slide over the fluid transfer tube 250 and the wear sleeve 254 is sized to slide over the thermal insulation sleeve 252. In various embodiments, the sealing assembly 230 further includes a first split ring 260 and a second split ring 262. In various embodiments, the first split ring 260 and the second split ring 262 have an inner circumference 264 that is sized to match an outer circumference 256 of the wear sleeve 254. In various embodiments, the first split ring 260 and the second split ring 262 are fastened together and about the fluid transfer tube 250 via one or more set screws 266. In addition, in various embodiments, a longitudinal vector L extending through an axis of the fluid transfer tube 250 proximate the casing 224 may be positioned at an angle A with respect to a normal vector N representing a surface normal to the outer surface 226 of the casing 224. Accordingly, a first interior surface 261 of the first split ring 260 and a second interior surface 263 of the second split ring 262 are shaped to have the same angle A that the longitudinal vector L makes with the normal vector N. Generally, then, in embodiments where the angle A is a non-zero value, the first split ring 260 and the second split ring 262 will comprise different geometries. On the other hand, in embodiments where the angle A has zero value, then the fluid transfer tube 250 extends straight through the sealing assembly 230, leading to embodiments where the first split ring 260 and the second split ring 262 may be identically shaped. In various embodiments, the first split ring 260 and the second split ring 262 may be constructed of lightweight but high strength materials, such as, for example, aluminum or titanium alloys. In various embodiments, the first split ring 260 and the second split ring 262 may comprise a single, monolithic structure—e.g., an annular ring—that is configured for friction fit against the wear sleeve 254, if present, or the transfer tube 250, if the wear sleeve 254 and thermal insulation sleeve 252 are not present.

Figure 2C:
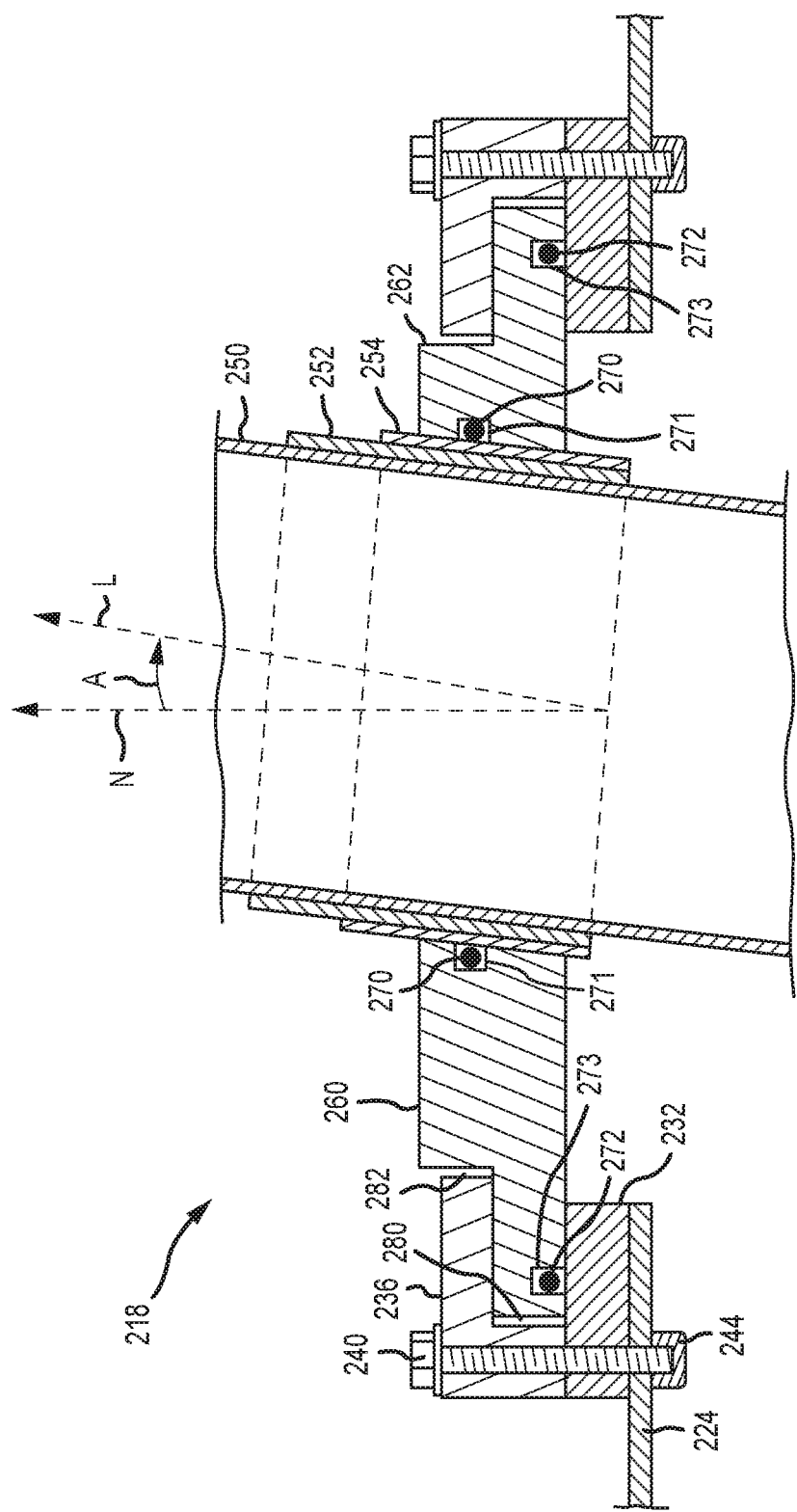

Referring now to FIG. 2C, an additional schematic view is provided, illustrating the longitudinal vector L, the normal vector N and the angle A, with respect to the fluid transfer tube 250, the first split ring 260 and the second split ring 262. In various embodiments, the first split ring 260 and the second split ring 262 are configured to house a first O-ring 270 and a second O-ring 272. In various embodiments, the first O-ring extends circumferentially about and makes contact with the wear sleeve 254. Following assembly of the sealing assembly 230, the first O-ring 270 provides a sealing means that enables the fluid transfer tube 250 to move in a direction along the longitudinal vector L in response to thermal deformation or vibratory excitation. Similarly, in various embodiments, the second O-ring 272 provides a sealing means that enables the fluid transfer tube 250 to move in a plane orthogonal to the normal vector N. In various embodiments, a first gap 280 and a second gap 282 extend circumferentially about an exterior surface of the first split ring 260 and the second split ring 262 and an interior surface of the attachment ring 236, thereby providing a space for the fluid transfer tube 250, together with the first split ring 260 and the second split ring 262, to move in the plane orthogonal to the normal vector N. In various embodiments, the first O-ring 270 is configured for seating within a first groove 271 and the second O-ring 272 is configured for seating within a second groove 273. Both the first groove 271 and the second groove 273 extend circumferentially about corresponding locations in both the first split ring 260 and the second split ring 262. In various embodiments, both O-rings are larger than the corresponding grooves to permit a seal and to provide a cushion between the moving surfaces in response to thermal deformation or vibratory excitation.

To assemble the sealing assembly 230 and, hence, the transfer tube assembly 218, the base member 232 is positioned over the fluid transfer tube 250 and about the outer surface 226 of the casing 224. The first O-ring 270 is slid about the fluid transfer tube 250, the thermal insulation sleeve 252 and the wear sleeve 254. The second O-ring 272 is then placed into position on the second side 233 of the base member 232. The first split ring 260 and the second split ring 262 are then placed into position about the fluid transfer tube 250 and the first O-ring 270 and the second O-ring 272 are urged into their corresponding first groove 271 and second groove 273, respectively. The one or more set screws 266 may then be used to fasten the first split ring 260 to the second split ring 262. The attachment ring 236 is then slid over the first split ring 260 and the second split ring 262 and oriented such that the plurality of holes 238 in both the base member 232 and the attachment ring 236 align. Each of the plurality of bolts 240 is then secured to corresponding ones of the plurality of threaded apertures 242 that are positioned through the casing 224 or the captured nuts 244 positioned on the inner side 222 of the casing 224, thereby securing the sealing assembly in place on the transfer tube assembly 218. In various embodiments, the thermal insulation sleeve 252 may not be present. The wear sleeve 254 may then be sized to fit directly to the fluid transfer tube 250 and assembled as above described. However, in various embodiments where neither the thermal insulation sleeve 252 nor the wear sleeve 254 is present, the first split ring 260 and the second split ring 262 may be sized such that the inner circumference 264 is sized to match an outer circumference 258 of the fluid transfer tube 250, thereby obviating the need for both the thermal insulation sleeve 252 and the wear sleeve 254.

When constructed and assembled as above described, the first O-ring 270 and the second O-ring 272, constructed of a flexible material, such as, for example, the molded rubber or elastomeric materials described above, will provide sufficient flexibility to enable the fluid transfer tube 250, together with the thermal insulation sleeve 252 and wear sleeve 254, if present, to translate in three dimensions with respect to the casing 224 in response to vibratory loads, high temperatures or differential thermal growth. Thus, the transfer tube assembly 218 may experience axial, radial or circumferential deflections, due to various thermal or mechanical sources, for longer periods of time or accumulated cycles of use without the fluid transfer components experiencing material fatigue. In addition, the construction and assembly disclosed herein enables the transfer tube assembly 218 to be assembled about the fluid transfer tube 250 having a flange, such as, for example, the flange 280 above described, that is non-removable from the fluid transfer tube 250 because of its attachment to the tube through welding or other permanent or semi-permanent manner of attachment. In various embodiments, for example, the first split ring 260 and the second split ring 262, rather than being slid over the fluid transfer tube 250, as would be required for a unitary or monolithic ring, are secured to each other about the tube as above described and fastened to one another using the one or more set screws 266. This feature of the disclosure enables replacement of the seal components without requiring removal of the flange.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly for a fluid transfer tube that extends through a casing in a gas turbine engine, the fluid transfer tube defining a longitudinal vector (L) extending through an axis of the fluid transfer tube proximate the casing and positioned at a non-zero angle (A) with respect to a normal vector (N) representing a surface normal to an outer surface of the casing, comprising:
    a base member having a first side configured to mate with the outer surface of the casing and a second side opposite the first side;
    an annular ring configured to mate with the second side of the base member and to surround a portion of the fluid transfer tube, the annular ring having a first interior surface and a second interior surface that are shaped to have the same angle (A) that the longitudinal vector (L) makes with the normal vector (N);
    a first O-ring disposed between the annular ring and the fluid transfer tube, the annular ring including a first groove configured for seating the first O-ring;
    a second O-ring disposed between the base member and the annular ring, the annular ring including a second groove configured for seating the second O-ring; and
    an attachment ring configured to secure the annular ring and the base member to the casing.

2. The seal assembly of claim 1, wherein the base member is constructed of a metallic material.

3. The seal assembly of claim 2, wherein the attachment ring is constructed of a metallic material.

4. The seal assembly of claim 3, wherein the annular ring is constructed of at least one of an aluminum alloy or a titanium alloy.

5. The seal assembly of claim 1, wherein the annular ring comprises a first split ring and a second split ring.

6. The seal assembly of claim 5, wherein both the base member and the attachment ring include a plurality of holes extending therethrough and configured for attaching the base member and the attachment ring to the casing via a plurality of bolts.

7. The seal assembly of claim 5, further comprising a wear sleeve configured to surround the portion of the fluid transfer tube.

8. The seal assembly of claim 7, wherein the wear sleeve is configured to surround a thermal insulation sleeve disposed between the portion of the fluid transfer tube and the wear sleeve.

9. A transfer tube assembly for a gas turbine engine, comprising:
    a fluid transfer tube configured to extend through a casing, the fluid transfer tube defining a longitudinal vector (L) extending through an axis of the fluid transfer tube proximate the casing and positioned at a non-zero angle (A) with respect to a normal vector (N) representing a surface normal to an outer surface of the casing;
    a base member having a first side configured to mate with the outer surface of the casing and a second side opposite the first side;
    an annular ring configured to mate with the second side of the base member and to surround a portion of the fluid transfer tube, the annular ring having a first interior surface and a second interior surface that are shaped to have the same angle (A) that the longitudinal vector (L) makes with the normal vector (N);
    a first O-ring disposed between the annular ring and the fluid transfer tube, the annular ring including a first groove configured for seating the first O-ring;
    a second O-ring disposed between the base member and the annular ring, the annular ring including a second groove configured for seating the second O-ring; and
    an attachment ring configured to secure the annular ring and the base member to the casing.

10. The transfer tube assembly of claim 9, further comprising a thermal insulation sleeve positioned between the fluid transfer tube and the annular ring.

11. The transfer tube assembly of claim 10, further comprising a wear sleeve positioned between the thermal insulation sleeve and the annular ring.

12. The transfer tube assembly of claim 11, wherein the annular ring comprises a first split ring and a second split ring.

13. A bleed air assembly for a gas turbine engine, comprising:
    a fluid transfer tube configured to provide compressed air from a compressor to a component external to the compressor, the fluid transfer tube defining a longitudinal vector (L) extending through an axis of the fluid transfer tube proximate the casing and positioned at a non-zero angle (A) with respect to a normal vector (N) representing a surface normal to an outer surface of the casing;
    a base member having a first side configured to mate with the outer surface of the casing and a second side opposite the first side;
    an annular ring configured to mate with the second side of the base member and to surround an exterior surface of the fluid transfer tube, the annular ring having a first interior surface and a second interior surface that are shaped to have the same angle (A) that the longitudinal vector (L) makes with the normal vector (N);

a first O-ring disposed between the annular ring and the fluid transfer tube, the annular ring including a first groove configured for seating the first O-ring;

a second O-ring disposed between the base member and the annular ring, the annular ring including a second groove configured for seating the second O-ring; and an attachment ring configured to secure the annular ring and the base member to the casing.

14. The bleed air assembly of claim 13, wherein the first O-ring and the second O-ring are configured to enable movement of the fluid transfer tube with respect to the casing.

15. The bleed air assembly of claim 14, further comprising a thermal insulation sleeve positioned between the fluid transfer tube and the annular ring.

16. The bleed air assembly of claim 14, further comprising a wear sleeve positioned between the fluid transfer tube and the annular ring.

17. The bleed air assembly of claim 14, wherein the annular ring comprises a first split ring and a second split ring.

* * * * *